United States Patent [19]
Kinder

[11] Patent Number: 5,361,784
[45] Date of Patent: Nov. 8, 1994

[54] SYSTEM FOR REMOVING AND DISPOSING OF CIGARETTE AND CIGAR SMOKE AND RESIDUES

[76] Inventor: Larry L. Kinder, 1016 E. El Camino Real, Suite 411, Sunnyvale, Calif. 94087

[21] Appl. No.: 37,895

[22] Filed: Mar. 26, 1993

[51] Int. Cl.⁵ ............................................. A24F 19/00
[52] U.S. Cl. .................................. 131/231; 131/242; 296/37.9; 296/37.11
[58] Field of Search ..................... 131/231, 240.1, 242, 131/329, 174, 232, 238, 242.5, 235.1; 296/37.8, 37.9, 37.11; 4/258, 262, 266, 267, 280–282

[56] References Cited

U.S. PATENT DOCUMENTS

| | | | |
|---|---|---|---|
| 991,263 | 5/1911 | Bajluk | 4/281 |
| 1,105,362 | 7/1914 | Mayer | 4/280 |
| 1,615,729 | 1/1927 | Thompson | 4/266 |
| 2,675,122 | 4/1954 | Minnie | 296/37.11 |
| 2,829,766 | 4/1958 | Gill | 131/231 X |
| 2,962,181 | 11/1960 | Nelson | 131/231 X |
| 3,113,665 | 12/1963 | Frost | 131/231 X |
| 4,643,204 | 2/1987 | Ford | 131/231 |

FOREIGN PATENT DOCUMENTS

| | | | |
|---|---|---|---|
| 1074084 | 10/1954 | France | 131/231 |
| 2806623 | 8/1978 | Germany | 131/231 |
| 362883 | 1/1932 | United Kingdom | 131/231 |

*Primary Examiner*—Jennifer Bahr
*Attorney, Agent, or Firm*—Spensley Horn Jubas & Lubitz

[57] ABSTRACT

A system for removing and disposing of smoke and residues produced by cigarettes or the like includes an ashtray unit adapted to be received by a valved receptacle in a tabletop or the like. The ashtray unit has a cigarette-holding portion and a passage connected to a residue-receiving canister adapted to be coupled to a vacuum source. A valve is disposed in the ashtray unit passage. In one embodiment, the valve is biased to a normally open position. In another embodiment, the valve is biased to a normally closed position. In the latter case, the ashtray unit includes a plurality of small passageways connecting the cigarette-holding portion with the passage, the passageways bypassing the normally closed valve.

15 Claims, 6 Drawing Sheets

SYSTEM FOR REMOVING AND DISPOSING OF CIGARETTE AND CIGAR SMOKE AND RESIDUES

FIELD OF THE INVENTION

The present invention relates generally to systems for exhausting cigarette and cigar smoke and for removing cigarette and cigar residues such as ashes and stubs. The invention relates more particularly to such systems of the vacuum type adapted for installation in a variety of facilities such as restaurants and casinos as well as in vehicles including automobiles, vans and RVs.

BACKGROUND OF THE INVENTION

Secondary cigarette and cigar smoke as a health hazard to smokers and non-smokers alike is increasingly being recognized. Secondary smoke is particularly noxious in enclosed spaces such as restaurants and other dining areas, casinos and vehicles. The annoyance and harmfulness of secondary smoke is only partly alleviated by air circulation systems designed to clear the air in such spaces.

A significant portion of secondary smoke is from burning cigarettes and cigars placed in ashtrays between inhalations by the smoker. Moreover, the ashes, stubs and other debris from smoking articles that accumulate in ashtrays are a source of noxious odors which can be eliminated only be constantly emptying and cleaning the ashtrays.

Accordingly, it is a principal object of the present invention to provide a system for exhausting and removing smoke from burning cigarettes and cigars placed in ashtray units and which is particularly effective in reducing the concentration of secondary smoke in enclosed spaces of the kind mentioned above.

It is another object of the present invention to provide a system for efficiently removing cigarette and cigar residues such as ashes and stubs and conveying them to a sealed receptacle or canister from which such residues can be readily removed.

It is yet another object of the present invention to provide an ashtray unit for holding a smoking article such as a cigarette or cigar and which is adapted to be removably received by a vacuum system valve mechanism installed in structures such as restaurant dining tables, countertops, casino gaming tables and the like.

It is still a further object of the present invention to provide an integral ashtray unit and residue-receiving canister which is connected to a residue-exhausting vacuum system yet is portable to some extent.

SUMMARY OF THE INVENTION

In accordance with one specific, exemplary embodiment of the invention, there is provided a system for removing and disposing of smoke and residues produced by smoking articles such as cigarettes and cigars and which achieves the foregoing objects. The system is adapted to be coupled to a vacuum source and comprises a canister having an interior for receiving said smoke and residues, the interior of the canister being adapted to be connected to the vacuum source. An ashtray unit having a portion adapted to hold a smoking article such as a cigarette or cigar, includes a passage in communication with the article-holding portion of the unit. Interposed in the passage is a normally open valve and an exhaust conduit couples the passage with the interior of the canister. The normally open valve permits the withdrawal of smoke and residues from the ashtray unit to the canister via the passage and exhaust conduit. Momentary closure of the normally open valve increases the suction in the exhaust conduit to facilitate transport of smoking article stubs inserted into the ashtray unit passage through the exhaust conduit to the canister so as to remove and dispose of said stubs.

BRIEF DESCRIPTION OF THE DRAWINGS

Further objects, advantages and features of the invention will become apparent from the detailed description of the preferred embodiments, below, when read in conjunction with the accompanying drawings in which.

DETAILED DESCRIPTION OF THE PREFERRED EMBODIMENTS

Figure 1:
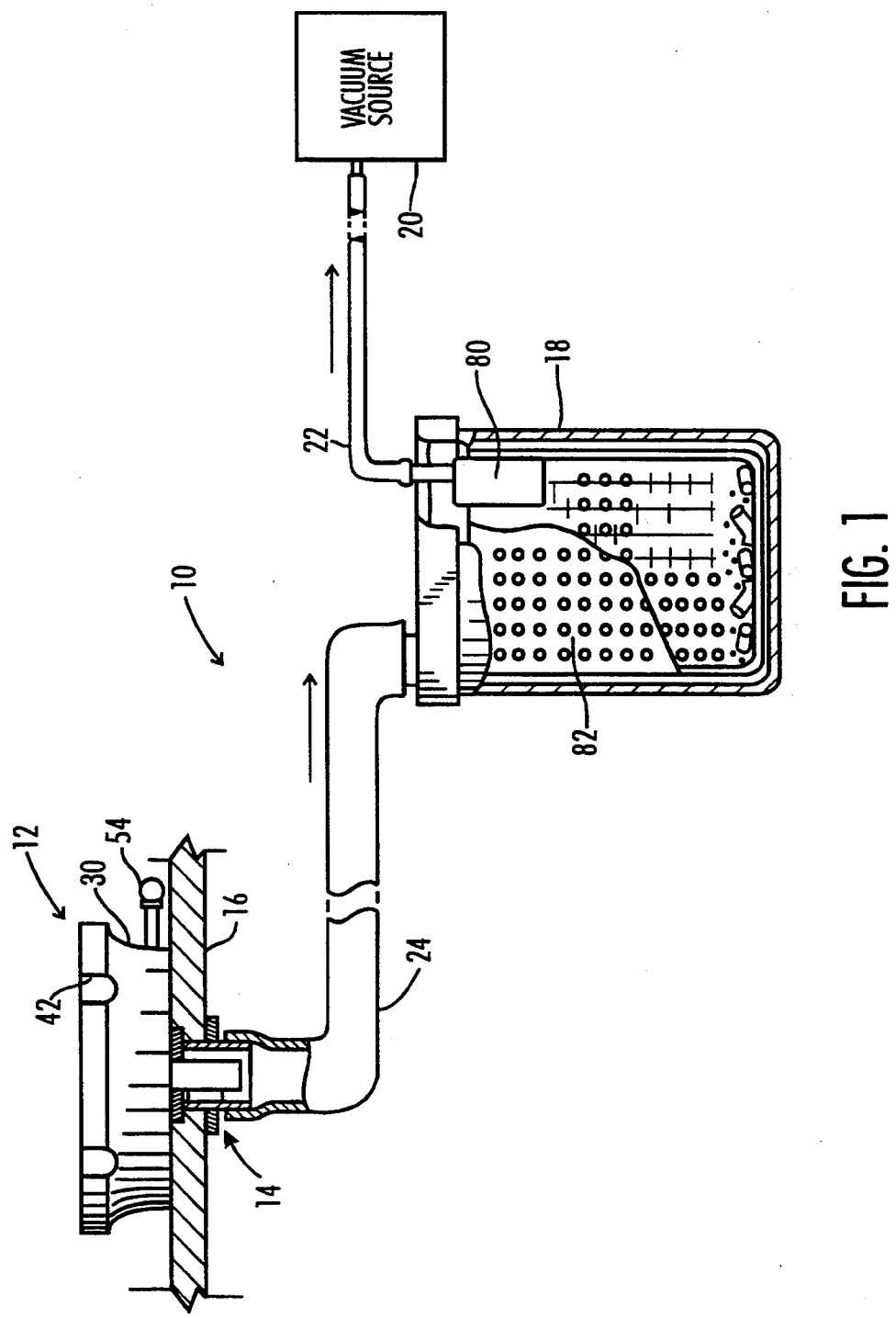
FIG. 1 is a side elevation view, partly in cross section, of a system for removing and disposing of cigarette and cigar smoke and residues, including an ashtray unit and canister, in accordance with one embodiment of the invention.

FIG. 1 shows a first embodiment 10 of the smoke and residue removal system of the invention including, generally, an ashtray unit 12 removably received by a valved receptacle 14 mounted in a structure 16 such as a counter or table top; a canister 18; a vacuum source 20; a conduit 22 coupling the vacuum source 20 and the canister 18; and a conduit 24 connecting the canister 18 and the valved receptacle 14.

Figure 2:
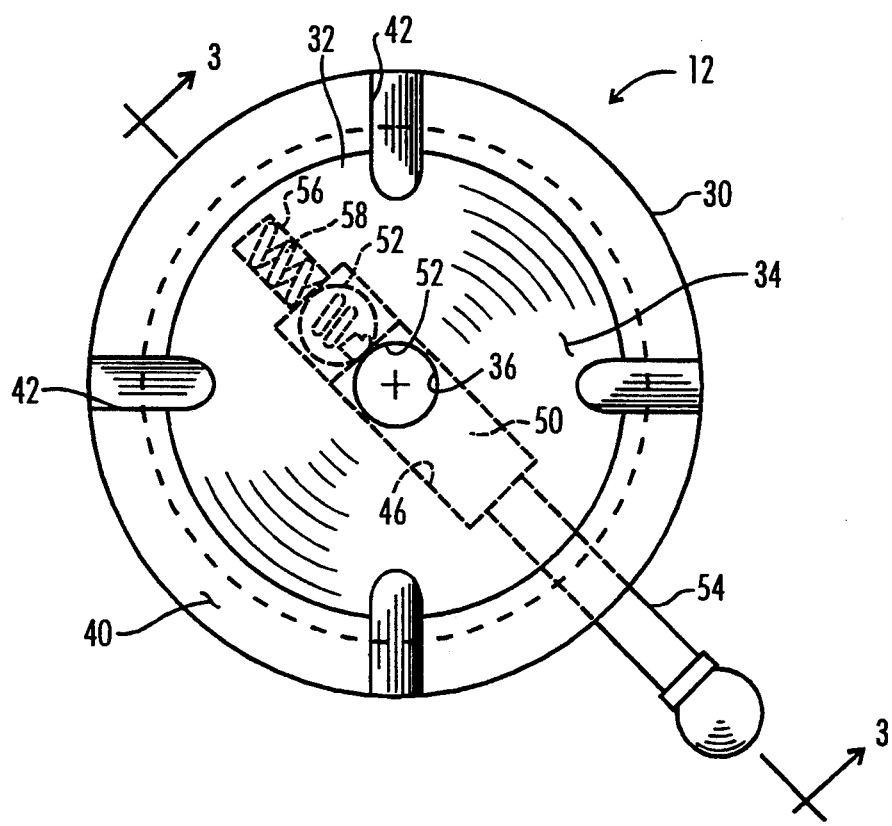
FIG. 2 is a top plan view of an ashtray unit forming part of the system of FIG. 1.
Figure 3:
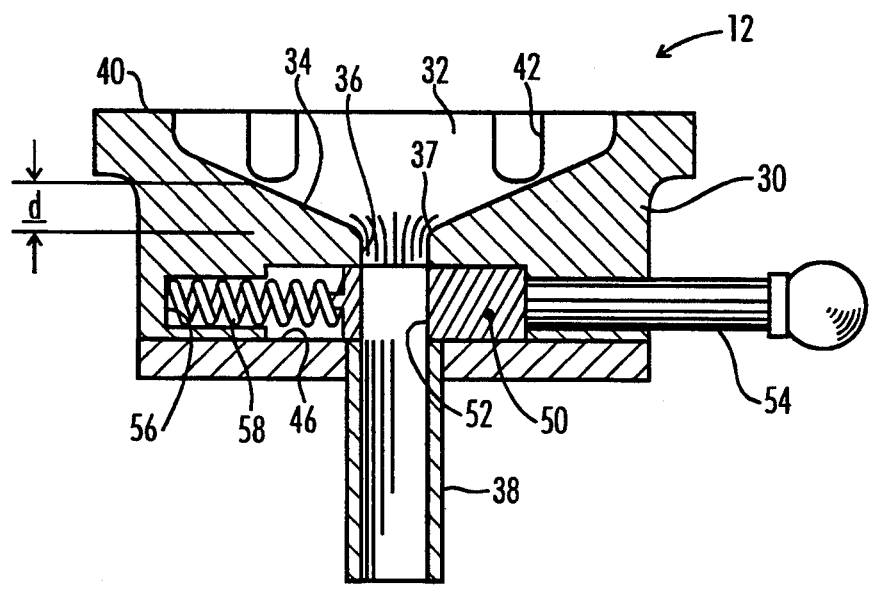
FIG. 3 is a side elevation view, in cross section, of the ashtray unit shown in FIG. 2 as seen along the section line 3—3.

The ashtray unit 12, details of which are additionally shown in FIGS. 2 and 3, includes a generally cylindrical main body 30 defining an interior funnel 32 comprising a conical surface 34 converging to a central passage 36 at its lower extremity. The passage 36 has an entrance 37 and communicates with a tube 38 depending from the bottom of the ashtray unit 12. The unit 12 further includes an upper rim 40 defining one or more generally U-shaped radial slots 42 for holding, in a well known manner, smoking articles such as cigarettes and/or cigars.

The ashtray unit body 30 also includes a narrow, rectangular transverse chamber 46 extending across substantially the entire length of a diameter of the body 30 and intercepting the passage 36. Mounted within an enlarged portion 48 of the chamber 46 is a slidable valve plate 50 having an opening 52 normally in alignment with the passage 36. Attached to one end of the valve plate 50 is an actuator 54 projecting from the body 30. Disposed between the other end of the valve plate 50 and an end wall 56 of the chamber 46 is a compression spring 58 biasing the slide valve plate 50 to the position shown in FIG. 3, that is, to a position in which the opening 52 is in alignment with the passage 36. Accordingly, the slide valve plate 50 of this embodiment is biased by the spring 58 to a normally open position. Depression of the actuator 54 moves the slide valve plate 50 against the bias of the spring 58 to a position in which the passage is sealed off by the valve plate, with the opening 52 moved off center as shown by the broken lines in FIG. 2.

Figure 4:
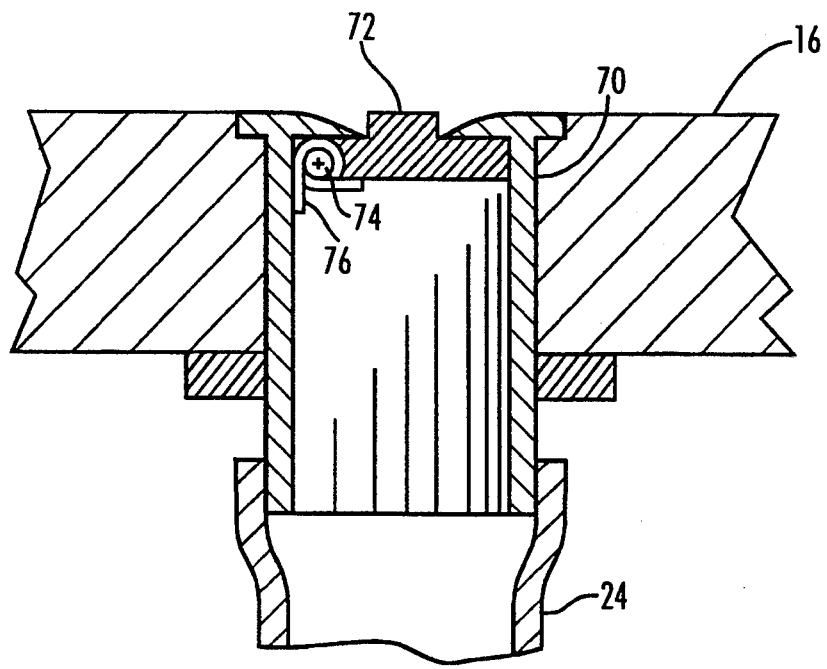
FIG. 4 is a side elevation view, in cross section, of a portion of a table or countertop incorporating a valved receptacle for receiving an ashtray unit in accordance with one aspect of the present invention.
Figure 5:
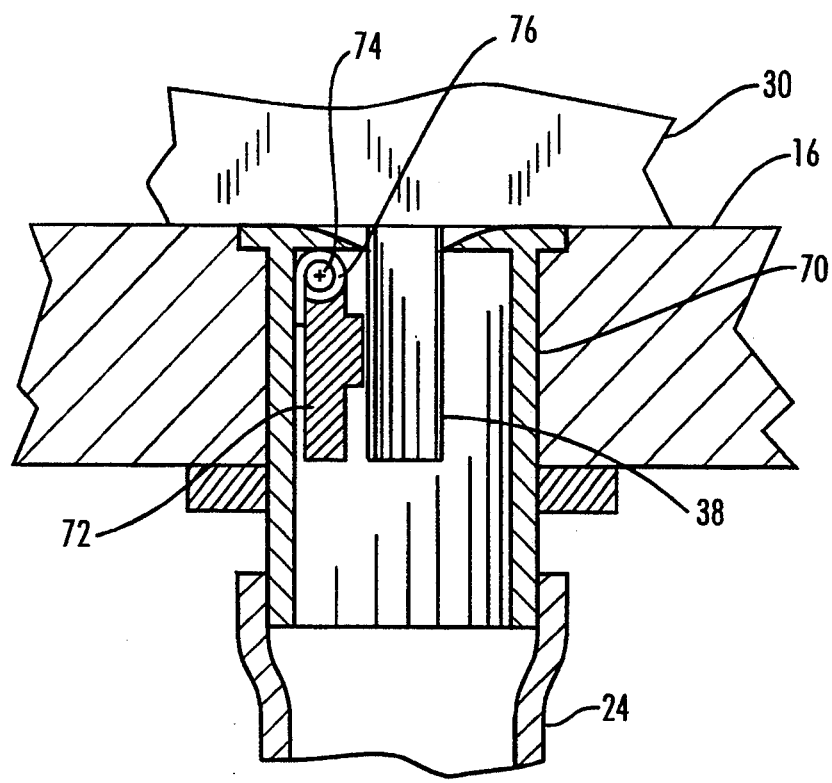
FIG. 5 is a side elevation view, in cross section, of the valved receptacle of FIG. 4 shown in its open position.

With reference now also to FIGS. 4 and 5, the valved receptacle 14 mounted in the counter or table top 16 includes a generally cylindrical housing 70 having at the top end thereof a flapper valve 72 mounted for pivoting about an axis 74 and biased by a coil spring 76 to a normally closed position (FIG. 4). Insertion of the ashtray unit tube 38 into the valved receptacle 14 pivots the flapper valve 72 to an open position as shown in FIG. 5 against the bias of the coil spring 76; conversely, removal of the ashtray unit 12 from the valved receptacle 14 allows the flapper valve 72 to close under the influence of the coil spring 76.

With reference again to FIG. 1, the vacuum source conduit 22 has an end portion projecting into the canister 18. The end portion of the conduit 22 is covered by a filter element 80 for blocking ashes, particles and other smoke article residues so as to prevent them from being drawn into the vacuum source 20. The canister 18 may be lined with a removable, perforated foil liner 82 to hold the debris drawn into the canister. The foil 82 liner is perforated so as to prevent collapse thereof under the action of the vacuum; the perforations are small enough so that the residues are retained within the liner 82. The foil liner also provides an extra margin of safety by providing a fire resistant retainer for any burning ashes or smoking articles.

It should be noted that in the ashtray unit 12 of the first embodiment the distance d (FIG. 3) between the bottom of the U-shaped slots 42 and the entrance 37 to the passage 36 is preferably selected so as not to be so great as to require excessive vacuum, but not so small as to cause the smoking article to burn too fast or to be drawn into the central passage 36. In accordance with one practical example of the invention, the optimum distance d was determined to be about ½-inch but it will be apparent to those skilled in the art that other distances may be utilized depending upon a number of variables including the nominal suction level produced by the vacuum source at the entrance 37 of the passage 36.

In the operation of the first embodiment, as is already evident from the foregoing description, smoke and ashes from one or more smoking articles held by the slots 42 are drawn into the passage 36 and from there into the canister 18. When the smoker wishes to dispose of the stub of the smoking article the stub is inserted into the passage 36 and the slide valve plate 50 is manually closed momentarily by pushing the actuator 54 to increase the local suction level to efficiently draw the stub into the canister 18.

Figure 6:
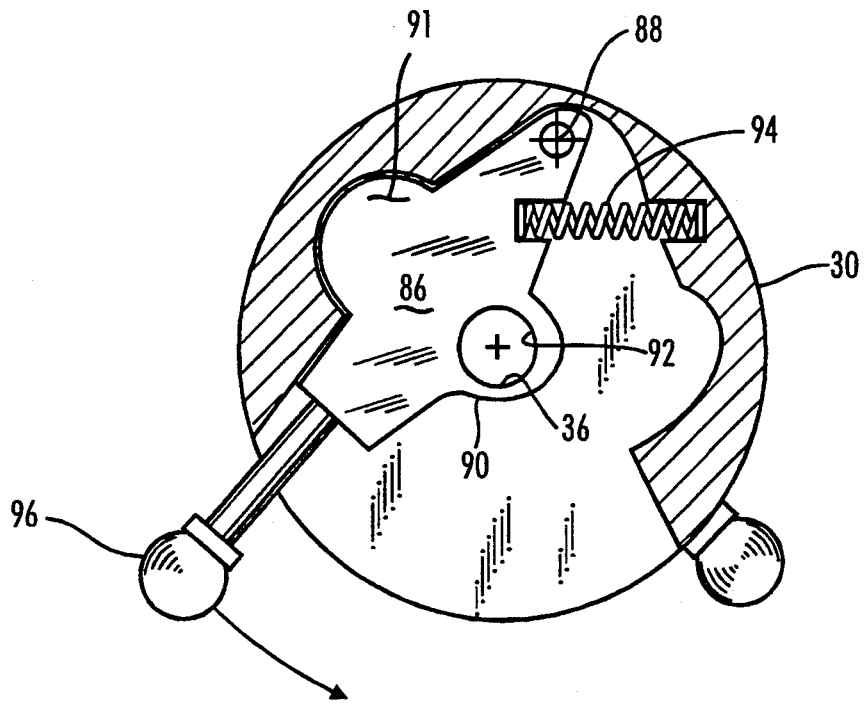
FIG. 6 is a transverse cross section of an ashtray unit in accordance with another embodiment of the invention.

FIG. 6 shows an alternative embodiment in which, instead of a linearly movable slide valve plate, a valve plate 86 pivotable about an axis 88 is utilized. The plate 86 has a pair of lobes 90, 91 one of which (90) has an opening 92, and the other of which (91) is solid. The plate 86 is biased by a spring 94 to the position shown in which the opening 92 is in alignment with the passage 36. Rotation of the pivotable valve plate 86 about the pivot axis 88 by means of a handle 96 attached to the valve plate and projecting from the ashtray unit causes the solid lobe 91 to close the passage 36. It will be appreciated that other than this, the operation of the embodiment of FIG. 6 is precisely the same as that of the first embodiment.

It will be appreciated that several ashtray units may be coupled to a single canister and associated vacuum source. In that case, because the central passages of all of the ashtray units (in accordance with the foregoing embodiments) would be normally open to atmosphere, the suction level of the vacuum source might not be sufficient to draw stubs and other debris into the canister. The alternative embodiment of FIGS. 7-9 overcomes this problem. In this embodiment, instead of a valve plate biased to a normally open position as in the prior embodiments, an ashtray unit 102 is provided having a slidable valve plate 104 that is biased to a normally closed position. Actuation of the valve plate 104 brings an opening 106 therein in alignment with a central passage 108 in the ashtray unit 102. Small passageways 110 providing communication between the conical side wall 112 of the ashtray unit funnel and the portion of the passage 108 below the valve plate 104, furnish sufficient suction to draw smoke from a smoking article 114 to a canister (not shown) coupled to a vacuum source. When it is desired to dispose of the smoking article stub and any ashes and residue accumulated in the ashtray unit, the valve plate 104 is momentarily moved manually to the open position so as to draw such ashes, residues and stubs into the canister. The valve plate 104 may be identical to that described previously except that it normally seals off the central passage 108 from the ashtray unit funnel, the bypass passageways 110 functioning to conduct smoke from the smoking article 114 to the passage 108.

In accordance with one specific practical example of the last mentioned embodiment, four bypass passageways 110, each 1/16-inch in diameter, are provided; the total area of the four passageways is thus about 0.0123 square inches, equal to that of a single opening about ⅛-inch in diameter.

Figure 7:
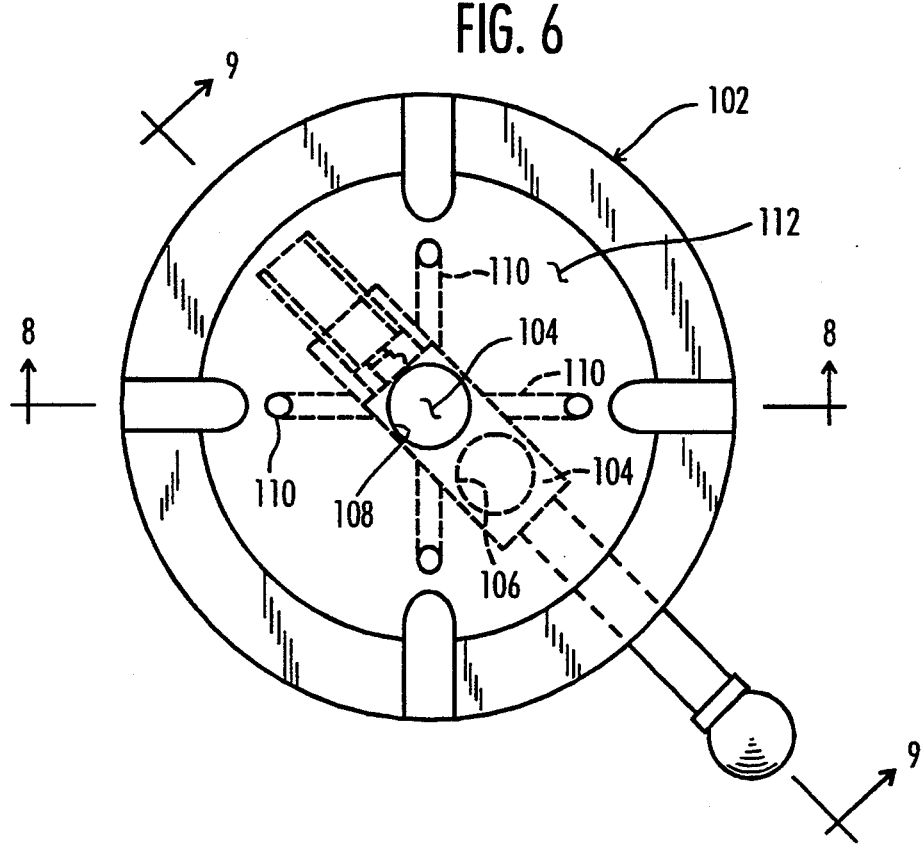
FIG. 7 is a top plan view of another embodiment of an ashtray unit in accordance with the invention.
Figure 8:
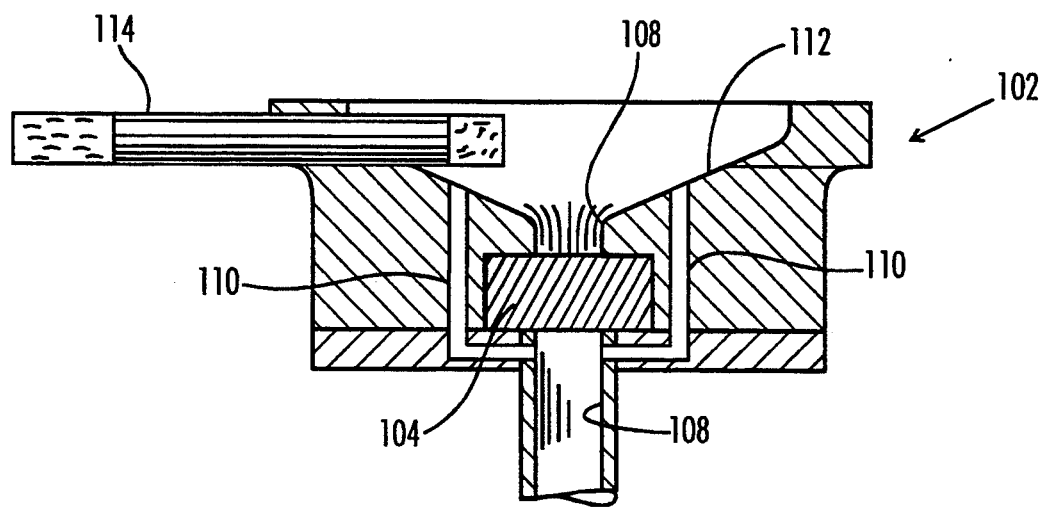
FIG. 8 is a side elevation view, in cross section, of the ashtray unit of FIG. 7 as seen along the section line 8—8 in FIG. 7.
Figure 9:
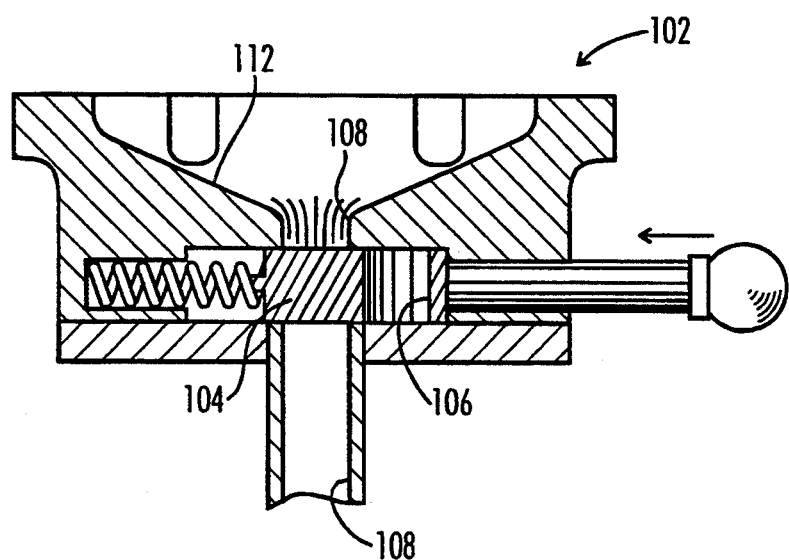
FIG. 9 is a side elevation view, in cross section, of the ashtray unit of FIG. 7 as seen along the section line 9—9 in FIG. 7.

It will be obvious to those skilled in the art that in the embodiment of FIGS. 7-9, instead of the bypass passageways 110, small vertical passageways may be added to the solid portion of the valve plate 104 to provide communication between the upper and lower portions of the central passage 108, the small passageways serving to remove smoke while preserving a sufficient vacuum level. As yet another alternative, such small passageways in the valve plate 104 may be provided in addition to the small passageways 110 in the ashtray unit body.

Figure 10:
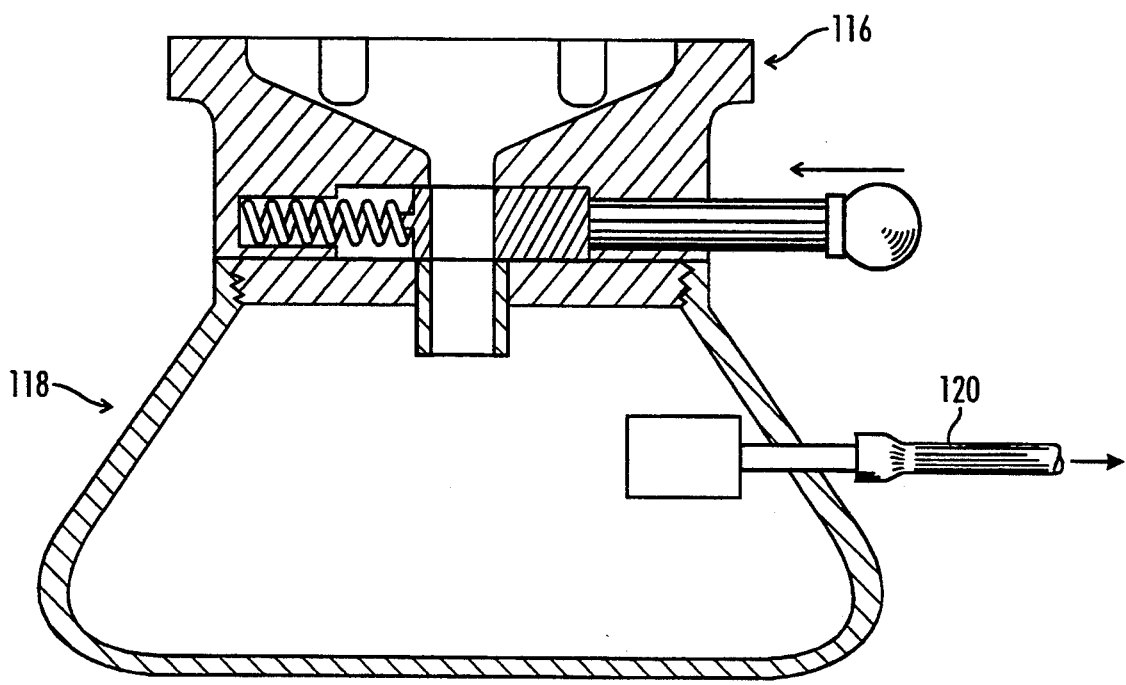
FIG. 10 is a side elevation view, in cross-section, of an integral ashtray unit and canister in accordance with yet another embodiment of the invention.

In another embodiment shown in FIG. 10, an ashtray unit 116 such as that already described is attached directly to a canister 118 so that the ashtray unit and canister form an integral structure. The canister 118 is coupled to a vacuum source (not shown) by means of a flexible conduit or tube 120. It will be appreciated that the embodiment of FIG. 10 provides a cigarette and cigar smoke and residue removal system that is portable to the extent permitted by the tube 120, and is particularly advantageous for use in hotel rooms and the like.

What is claimed is:

1. A system for removing and disposing of smoke and residue produced by smoking articles, the system comprising:

a vacuum source;

a canister having an interior for receiving said smoke and residues, said interior of said canister being connected to said vacuum source;

an ashtray unit having a portion adapted to hold a smoking article such as a cigarette or cigar, the ashtray unit including a passage in communication with the article holding portion of the ashtray unit;

a valve in the passage, said valve being biased to a normally open position;

means coupled to said valve for closing said valve; and an exhaust conduit coupling the passage with the interior of the canister, the normally open valve permitting the withdrawal of smoke and residues from the ashtray unit to the canister via the passage and exhaust conduit, closure of the normally open valve increasing the suction in the exhaust conduit to facilitate transport of smoking article stubs inserted into the ashtray unit passage through the exhaust conduit to the canister so as to remove and dispose of said stub.

2. A system, as defined in claim 1, which said ashtray unit includes a tube in alignment with said ashtray unit passage, said normally open valve being interposed between said tube and said passage;

said system further including:

means defining a surface, the surface-defining means including a valved receptacle for receiving said tube, the valved receptacle being connected to the exhaust conduit and including a normally closed valve, said tube and said valved receptacle being operatively associated so that insertion of said tube into the valved receptacle opens said normally closed valve to provide communication between the exhaust conduit and the article holding portion of the ashtray unit.

3. A system, as defined in claim 1, in which:

the ashtray unit and the canister are coupled to each other to form an integral structure.

4. A system, as defined in claim 1, in which:

the valve comprises a valve plate linearly displaceable between the open and the closed positions.

5. A system, as defined in claim 1, in which:

the valve comprises a valve plate rotatably displaceable about a pivot axis between the open and the closed positions.

6. A system for removing and disposing of smoke and residues produced by smoking articles, the system comprising:

a vacuum source;

a canister having an interior for receiving said smoke and residues, the interior of said canister being coupled to said vacuum source;

an ashtray unit having a portion adapted to hold a smoking article such as a cigarette or cigar, the ashtray unit including a passage in communication with the article holding portion of the ashtray unit;

a valve in said passage, said valve being biased to a normally closed position;

means coupled to said valve for opening said valve;

at least one passageway in the ashtray unit coupling the article-holding portion of the ashtray unit with the passage, said passageway bypassing the normally closed valve; and an exhaust conduit coupling the passage with the interior of the canister, the at least one bypass passageway withdrawing smoke from said ashtray unit when the valve is in its normally closed position, opening of the valve allowing transport of smoking article stubs and other residues from the ashtray unit to the canister.

7. A system, as defined in claim 6, in which:

said ashtray unit includes a tube in alignment with said ashtray unit passage, said normally closed valve being interpose between said tube and said passage;

said system further including;

means defining a surface, the surface-defining means including a valved receptacle for receiving said tube, the valved receptacle being connected to the exhaust conduit and including a second normally closed valve, said tube and said valved receptacle being operatively associated so that insertion of said tube into the valved receptacle opens said second normally closed valve to provide communication between the exhaust conduit and the article holding portion of the ashtray unit.

8. A system, as defined in claim 6, in which:

the ashtray unit and the canister are coupled to each other to form an integral structure.

9. A system, as defined in claim 6, in which:

the valve comprises a valve plate linearly displaceable between the open and the closed positions.

10. A system, as defined in claim 6, in which:

the valve comprises a valve plate rotatably displaceable about a pivot axis between the open and the closed positions.

11. An ashtray unit adapted to be coupled to a vacuum system for removing and disposing of smoke and residues produced by smoking articles such as cigarettes and cigars, said ashtray unit comprising:

a portion adapted to hold a smoking article;

a substantially central passage adapted to be coupled to said vacuum system;

an interior surface connecting the article-holding portion and said passage;

a valve interposed in said passage, said valve being movable between an open position and a closed position; and at least one passageway providing communication between said interior surface and said passage, said passage bypassing said valve.

12. An ashtray unit, as defined in claim 11, in which:

said valve is biased to a normally open position.

13. An ashtray unit, as defined in claim 11, which:

said valve is biased to a normally closed position.

14. An ashtray unit, as defined in claim 13, which includes:

at least one passageway providing communication between said interior surface and said passage, said passageway bypassing said valve.

15. An ashtray unit, as defined in claim 11, in which:

the interior surface has a generally conical shape, said surface converging from said article-holding portion to said passage.

* * * * *